United States Patent
Seo

(10) Patent No.: US 7,545,524 B2
(45) Date of Patent: Jun. 9, 2009

(54) METHOD OF CONTROLLING OPERATION OF IMAGE SENSOR

(75) Inventor: In-sik Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 10/959,986

(22) Filed: Oct. 8, 2004

(65) Prior Publication Data

US 2005/0231770 A1    Oct. 20, 2005

(30) Foreign Application Priority Data

Apr. 16, 2004    (KR) ...................... 10-2004-0026191

(51) Int. Cl.
*H04N 1/00* (2006.01)
(52) U.S. Cl. ..................... 358/1.14; 358/474
(58) Field of Classification Search ................ 358/497, 358/1.14, 474; 399/88, 208, 210
See application file for complete search history.

(56) References Cited

U.S. PATENT DOCUMENTS

| | | | | |
|---|---|---|---|---|
| 4,561,764 A * | 12/1985 | Sugiura | ...................... | 399/210 |
| 4,561,771 A * | 12/1985 | Sugiura | ...................... | 399/208 |
| 4,568,171 A * | 2/1986 | Ikenoue | ...................... | 399/208 |
| 5,065,189 A | 11/1991 | Mizude | | |
| 5,168,377 A * | 12/1992 | Nagano | ...................... | 358/471 |
| 5,239,393 A * | 8/1993 | Takeuchi | ..................... | 358/474 |
| 5,673,126 A * | 9/1997 | Ando | ........................ | 358/498 |
| 5,895,913 A * | 4/1999 | Christensen | ................ | 250/235 |
| 6,476,373 B1 * | 11/2002 | Gilpin | ..................... | 250/208.1 |
| 6,765,700 B1 * | 7/2004 | Naito et al. | .................. | 358/486 |
| 7,221,485 B2 * | 5/2007 | Naito et al. | .................. | 358/474 |
| 2001/0043372 A1 * | 11/2001 | Suzuki et al. | ................ | 358/474 |
| 2001/0053002 A1 * | 12/2001 | Kageyama et al. | .......... | 358/471 |
| 2004/0223194 A1 * | 11/2004 | Naito et al. | .................. | 358/497 |
| 2008/0155294 A1 * | 6/2008 | Kikuchi et al. | .............. | 713/340 |

FOREIGN PATENT DOCUMENTS

| | | |
|---|---|---|
| JP | 05-107650 | 4/1993 |
| JP | 05-107651 | 4/1993 |
| KR | 1992-5304 | 7/1992 |
| KR | 1992-0005304 | 7/1992 |

OTHER PUBLICATIONS

Korean Office Action issued Nov. 28, 2005 in corresponding Korean application.

* cited by examiner

*Primary Examiner*—Kimberly A Williams
(74) *Attorney, Agent, or Firm*—Stanzione & Kim, LLP

(57) ABSTRACT

A method of controlling an operation of an image sensor when the image sensor stops due to a mechanical error or a power interruption while moving along a scanning path in a certain direction to scan a document in an apparatus having a scanning function, and when the power is re-supplied, includes acquiring image information of an upper part of the image sensor by scanning the upper part of the stopped image sensor, determining a position of the image sensor based on the image information of the upper part of the image sensor, and controlling the image sensor to move to a home position by moving the image sensor to a right side by a certain distance and re-scanning a home sensing label when the image sensor is located in the home position and at a left side of the home position, or controlling the image sensor to move toward the home position when the image sensor is located in a right side of the home position.

19 Claims, 3 Drawing Sheets

DIRECTION OF IMAGE SENSOR MOVEMENT

METHOD OF CONTROLLING OPERATION OF IMAGE SENSOR

CROSS-REFERENCE TO RELATED APPLICATIONS

This application claims the benefit of Korean Patent Application No. 2004-26191, filed on Apr. 16, 2004 in the Korean Intellectual Property Office, the disclosure of which is incorporated herein by reference in its entirety.

BACKGROUND OF THE INVENTION

1. Field of the Invention

The present general inventive concept relates to a method of controlling an operation of an image sensor of a multifunction apparatus having a digital copying function. More particularly, the present general inventive concept relates to a method of controlling an operation of an image sensor to prevent an error of a product occurring when a power is resupplied after the image sensor is stopped due to an erroneous operation of a digital copier or a power interruption.

2. Description of the Related Art

In general, a multifunction machine, which is called a multi-function peripheral (MFP), includes separate functions of office machines, such as a facsimile machine, a scanner, a printer, and a copier, integrated into a single terminal. The multifunction machine is independently used or is connected to a computer.

By way of example, a digital copier is described below.

FIG. 1 is a block diagram illustrating a conventional digital copier. The digital copier includes a scanning part 70, a cartridge 30, a displayer 60, an input part 20, a storage 50, a print part 40, and a controller 10.

The scanning part 70 scans an image of a document, and the cartridge 30 receives papers to be printed with the image of the document scanned in the scanning part 70. The cartridge 30 may receive one kind of sheets of paper or different kinds of sheets of paper. A size of the received paper includes A4, A3, B5, B3, etc.

The displayer 60 displays an image of the paper and a print image of the scanned document on the paper image. The displayer 60 includes a liquid crystal display (LCD) for displaying the print image of the scanned document and the image of the paper, and a touch operation panel for inputting a certain command.

The input part 20 includes a plurality of input buttons for inputting a setup command for the document, an option command for the paper type, and a copy operation start command. The setup command sets up an orientation, a size, and a rotation angle with respect to the print image of the scanned document. The option command sets up an orientation, a size, and a rotation angle with respect to the image of the paper.

The print part 40 prints the print image of the scanned document onto the paper. The controller 10 controls the displayer 60 and the print part 40 according to a command input through the input part 20 by a user.

FIG. 2 is a detailed diagram of the scanning part 70 of FIG. 1. The scanning part 70 includes an image sensor 74, a platen glass 78, and a home sensing label 72.

When the user inputs the copy operation start command, the image sensor 74 starts to move. The moving image sensor 74 emits an optical signal (light) onto a document 76 which is placed on the platen glass 78, and receives through an image reading part 75 a signal corresponding to the light reflected from the document 76. The image sensor 74 extracts the image of the document based on the signal received from the image reading part 75.

The image sensor 74 determines start and stop positions of the image sensor 76 by extracting an image of the home sensing label 72 which is attached to an upper portion of a left side of the platen glass 78.

If a mechanical error or a power interruption occurs during an operation of the digital copier, the image sensor 74 stops at an abnormal position. Then, when the power is re-applied, the image sensor 74 forcibly moves along a +X direction for about 20 mm from a position (a) and returns to a normal position (b).

When the mechanical error or the power interruption causes the image sensor 74 to be located opposite to the home sensing label 72, that is, when the image sensor stops at a position (c), the image sensor 74 collides with a right wall in the scanning part 70. Accordingly, the image sensor is subject to shocks, and the collision results in an error of the digital copier.

SUMMARY OF THE INVENTION

In order to solve the forgoing and/or other problems, it is an aspect of the present general inventive concept to provide a method of controlling an operation of an image sensor to address (avoid) an error of a product and to prevent the image sensor from forcibly moving to a right side of a home position when a power is supplied.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of controlling an operation of an image sensor which stops due to a mechanical error or a power interruption while moving to a certain direction to scan in an apparatus having a scanning function, when power is re-supplied, the method comprising acquiring image information on an upper part of the image sensor by scanning the upper part of the stopped image sensor, determining a position of the image sensor according to the image information of the upper part of the image sensor, and controlling the image sensor to move to a home position by moving the image sensor in a right direction by a certain distance and re-scanning a home sensing label when the image sensor is located in the home position and on a left side of the home position, or controlling the image sensor to move toward the home position when the image sensor is located on a right side of the home position.

In an aspect of the present general inventive concept, the home position may be a location where the image sensor stops and starts to move when the scanning apparatus normally operates.

In another aspect of the present general inventive concept, the certain distance may be about 20 mm.

In yet another aspect of the present general inventive concept, the image sensor may be one of a contact image sensor (CIS) or a charge-coupled device (CCD).

In still another aspect of the present general inventive concept, the home sensing label may comprise an X portion including a black pixel part and a Y portion including a black pixel part and a white pixel part, and a lower part of the Y portion can be the home position of the image sensor.

The foregoing and/or other aspects and advantages of the present general inventive concept may be achieved by providing a method of a scanning apparatus to control an image sensor which stops due to a mechanical error or a power interruption and moves along a scanning path in a certain direction to scan in a scanning apparatus when power is re-supplied, the scanning apparatus comprising an image sensor to scan an upper part having one or more patterns disposed above the image sensor to acquire image information of the upper part, a home sensing label to form a portion of the upper part, a protection wall disposed on an end portion of a scanning path of the image sensor; and a controller to determine a position of the image sensor according to the image information of the upper part of the image sensor, and to control the image sensor to move from the position to the home position in one of first and second directions according to the current position of the image sensor and an image change of the image information of the one or more patterns.

BRIEF DESCRIPTION OF THE DRAWINGS

These and/or other aspects and advantages of the invention will become apparent and more readily appreciated from the following description of the embodiments, taken in conjunction with the accompanying drawing figures of which.

DETAILED DESCRIPTION OF THE PREFERRED EMBODIMENTS

Figure 1:
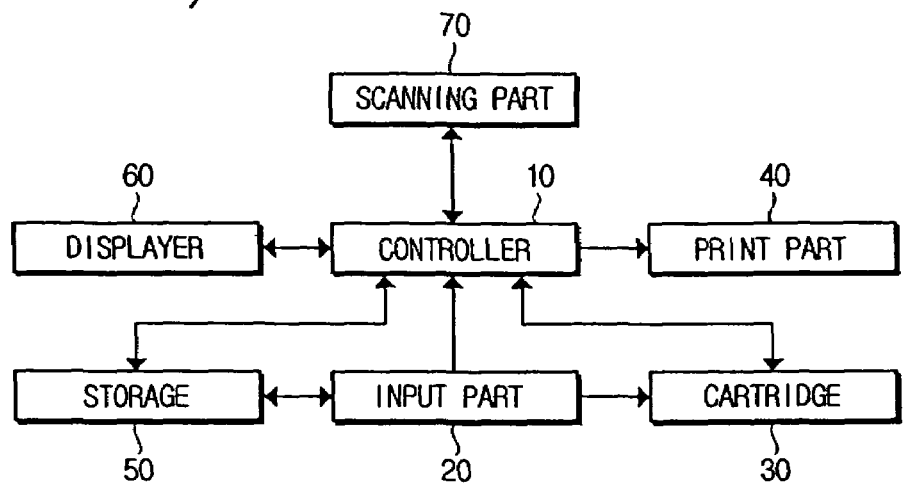
FIG. 1 is a function block diagram illustrating a conventional digital copier.

Reference will now be made in detail to the embodiments of the present invention, examples of which are illustrated in the accompanying drawing figures, wherein like reference numerals refer to the like elements throughout. The embodiments are described below in order to explain the present invention by referring to the drawing figures.

Figure 2:
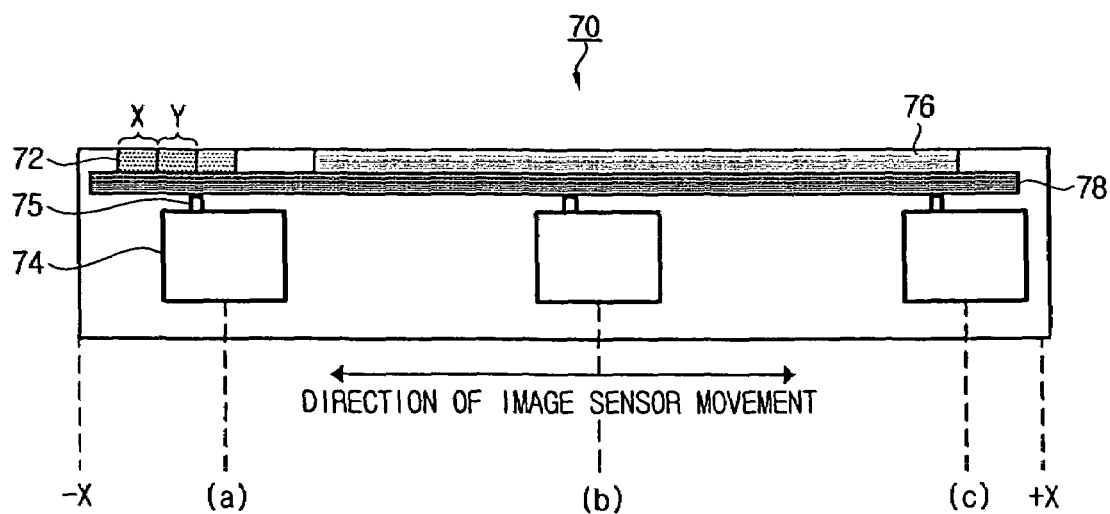
FIG. 2 is a detailed diagram illustrating a scanning part of FIG. 1.
Figure 3:
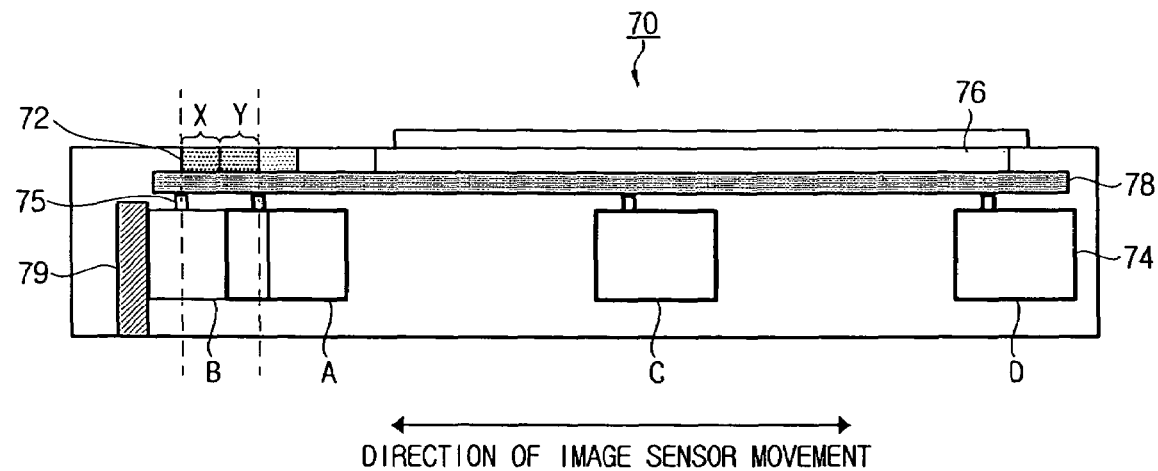
FIG. 3 is a detailed diagram illustrating a scanning part of a multifunction apparatus according to an embodiment of the present general inventive concept.

FIG. 3 is a detailed diagram illustrating a scanning part of a multifunctional apparatus according to an embodiment of the present general inventive concept. Referring to FIG. 3, the scanning part 70 may include a home sensing label 72, an image sensor 74, an image reading part 75, a document 76, and a platen glass. Since the scanning part of FIG. 3 is similar to a scanning part 70 of FIG. 2 in structure, the detail descriptions about the similar structure will be omitted.

The image sensor 74 can scan images of the home sensing label 72 and the document 76 using an optical energy, and can electrically convert a density of the optical energy into the scanned images. The image sensor 74 may be a contact image sensor (CIS) or a charge-coupled device (CCD).

A protection wall 79 can be disposed on a left end portion of the scanning part 70. The protection wall 79 can prevent the image sensor 74 from colliding with a left sidewall of the scanning part 70 when the image sensor 74 moves toward the left end portion of the scanning part 70. Other elements, except the protection wall 79, of the scanning part 70 have the same structure and function as in FIG. 2, and detailed descriptions of the same elements are omitted for the sake of conciseness.

Figure 4:
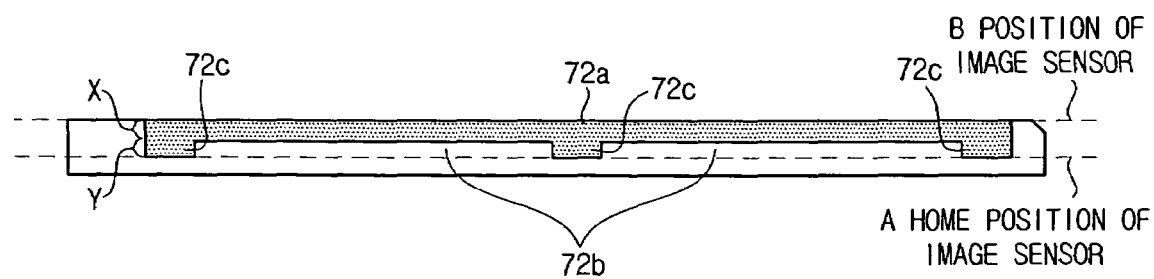
FIG. 4 is a plane view illustrating a home sensing label of FIG. 3.

FIG. 4 is a plane view illustrating the home sensing label 72 of FIG. 3. Referring to FIGS. 3 and 4, the home sensing label 72 can be divided into an X portion and a Y portion. The X portion can be a black pixel part 72a having about 1288 pixels. The Y portion can be provided with three black pixel parts 72c having about 100 pixels and two white pixel parts 72b having about 494 pixels disposed between the black pixel parts 72c.

A lower part of the Y portion of the home sensing label 72, that is, an A position of FIG. 3, can be an original position where the image sensor 74 stops in a normal operation. Hereinafter, the A position is referred to as a home position.

The X portion of the home sensing label 72 is not the original position where the image sensor 74 stops in the normal operation. When the image sensor 74 cannot spot the home position, or a mechanical error occurs, the image sensor 74 can stop under the X portion of the home sensing label 72, that is, at a B position of FIG. 3.

Figure 5:
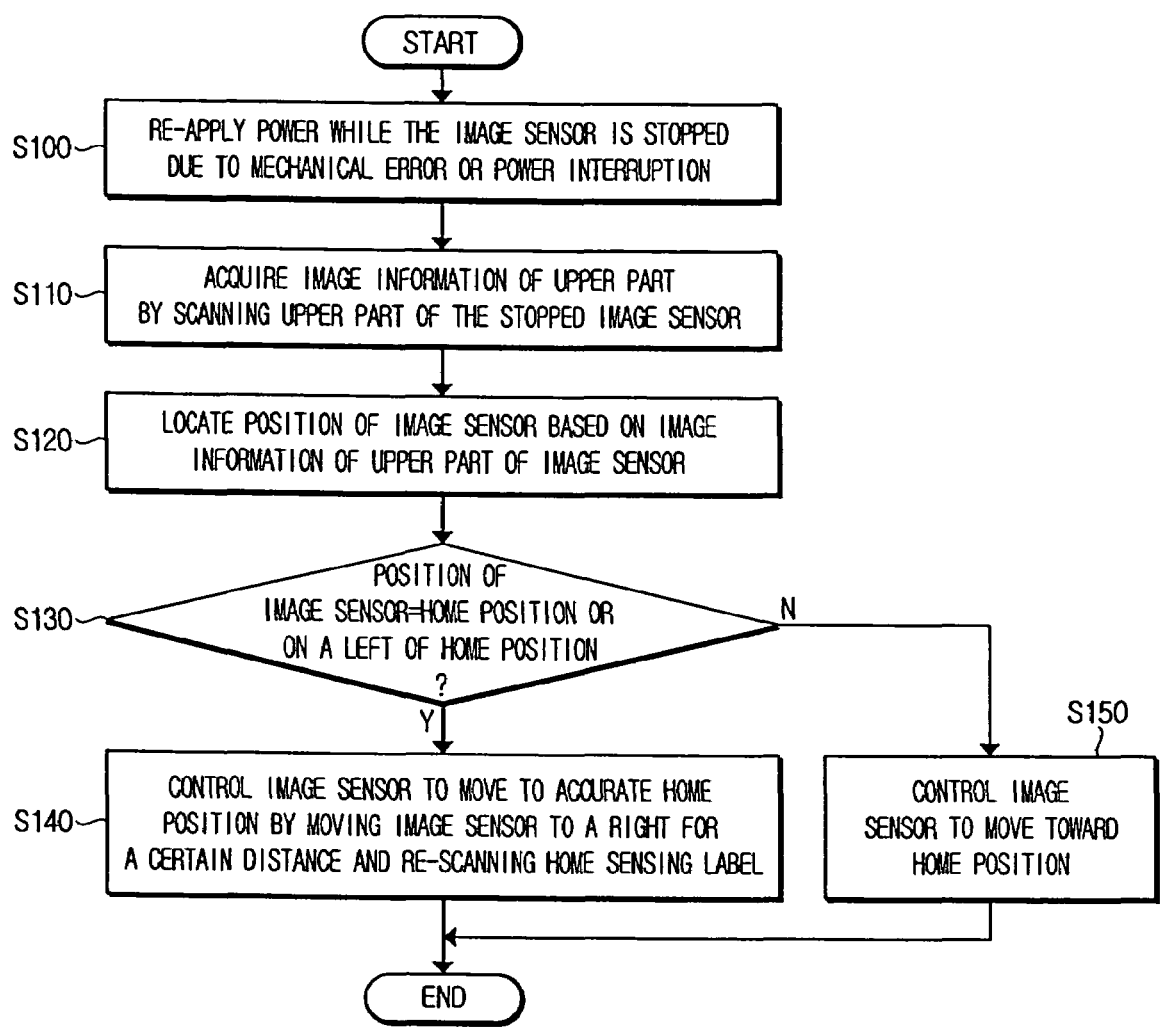
FIG. 5 is a flowchart illustrating a method of a scanning part of a multifunction apparatus according to an embodiment of the present general inventive concept.

FIG. 5 is a flowchart illustrating a method of a scanning part of a multifunction apparatus according to another embodiment of the present general inventive concept. Referring to FIGS. 1, 3, 4, and 5, the method of controlling an operation of the image sensor 74 according to another embodiment of the present general inventive concept is described below.

If a copy operation starts normally, the image sensor of FIG. 3 can initiate a movement at the home position and stops at the home position. If a systematic error occurs or a power is interrupted while the image sensor 74 is moving during the copy operation, the image sensor can stop at a certain position until the power is re-supplied in operation S100.

When the power is re-applied (supplied), the image sensor 74 can scan an upper part of a position where the image sensor 74 stops through the image reading part 75 in operation S110. The upper part may be disposed above the image sensor 74.

In FIG. 3, when the image sensor 74 stops at the A position and scans the upper part of the A position, the Y portion of the home sensing label 72 can be scanned. When the image sensor 74 stops at the B position and scans the upper part of the B position, the X portion of the home sensing label 72 can be scanned. The X portion is not disposed in the original position where the image sensor 74 stops in the normal operation, and can include only the black pixel part 72a. The X portion and the Y portion are disposed to correspond to the image sensor 74 in the B portion and the A portion, respectively.

If the image sensor 74 cannot spot (find) the home position or an erroneous operation occurs, the image sensor 74 may stop under the X portion of the home sensing label 72, that is, at the B position of FIG. 3. If the image sensor 74 stops at a C position or a D position and scans its upper part, a non-home sensing label portion, such as the document 76 or a white sponge which is attached to a cover (not shown), can be scanned.

Accordingly, image information on the upper part scanned by the image sensor 74 can be input to a controller 10 of FIG. 1. The image information may include one or more scanned images of the X portion, the Y portion, and the document 76 or the white sponge disposed to correspond to the A, B, C, and D positions, respectively.

The controller 10 can locate the image sensor 74 based on the image information input from the image sensor 74 in operation S120. Specifically, the controller 10 can locate (determine) the position where the image sensor 74 stops with respect to the Y position of the home sensing label 72, that is, the home position of FIG. 3. The home position of the image sensor 74 can indicate a start position where the image sensor stops during the normal operation of the digital copier.

The controller 10 can determine whether the image sensor 74 is located in the home position A or on a left side of the home position A in operation 130.

When the image sensor 74 stops at a certain position, for example, the home position or near home position, the image sensor 74 can scan the upper part so that the controller 10 can recognize that a white portion is narrower in the left side than the right side or a black portion is wider in the left side than the right side with respect to a current position of the image sensor 74 due to the existence of the black pixel parts 72a and 72c and the white pixel parts 72b.

Accordingly, the controller 10 can input a control signal to the image sensor 74 to move from the protection wall 79 toward the right side of the protection wall 79. The image sensor 74 can move toward the right side of the document by a certain distance, can re-scan the home sensing label 72, and moves toward the home position in operation S140. The image sensor 74 can move to the right side to by the certain distance so as to be accurately located in the home position. According to an aspect of the present general inventive concept, the certain distance is about, or substantially about 20 mm.

When the image sensor 74 stops at the left side of the home position A, that is, the B position of FIG. 3, the image sensor 74 is operated as described above. In this case, the image sensor 74 may contact the protection wall 79 or disposed close to the protection wall 79. Specifically, the controller 10 can recognize that the image information on the left side is narrow and the image information on the right side is wide with respect to the current position of the image sensor 74 due to the existence of the home sensing label 72.

Accordingly, the controller 10 can control the image sensor 74 to move from the protection wall 79 to the right side of the document 76 by a certain distance and to re-scan the home sensing label 72. Under the control of the controller 10, the image sensor 74 can move to the right side by the certain distance and re-scans the home sensing label 72 so as to move accurately to the home position in operation S140. According to an aspect of the present general inventive concept, the certain distance is about, or substantially about 20 mm.

When the image sensor 74 is not located in the home position or on the left side of the home position, that is, when the image sensor 74 is located on the right side of the home position, the image sensor 74 can operate as below.

When the image sensor 74 stops on the right side of the home sensing label 72, that is, when the image sensor 74 stops at the C and D positions of FIG. 3, the controller 10 can recognize that the image sensor 74 is located on the right side of the home position since the image information represents that the upper part corresponding to the document 76 or the white sponge is scanned other than the home sensing label 72. Hence, the controller 10 can control the image sensor 74 to move toward the home position in operation S150.

While moving toward the home position, the image sensor 74 can scan the home sensing label 72. Then, the controller 10 can recognize that a characteristic of the image information on the left side is narrow and the characteristic of the image information on the right side is wide with respect to the current position (home position) of the image sensor 74. That is, a certain portion of the scanned image is changed to become narrower or wider when the image sensor 74 moves toward the home position to scan the home sensing label 74.

Subsequently, the image sensor 74 can move accurately to the home position by performing the same operation as is located at the home position.

In a conventional copier, when an image sensor 74 stops at a D position and the power is re-supplied, the image sensor 74 can be forcibly moved to a right side to collide with a right sidewall of a scanning part 70, as shown in FIG. 2. However, this problem is overcome according to this embodiment of the present general inventive concept.

As described above, even though the image sensor abruptly stops due to the mechanical error or the power interruption, the controller can determine the position of the image sensor and can control the operations of the image sensor when the power is resupplied.

The image sensor can be prevented from forcibly moving to the right side to collide with the right sidewall of the scanning part, thus addressing (avoiding) error causes of the digital copier.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an image sensor which stops due to a mechanical error or a power interruption while moving along a scanning path in a certain direction to scan in a scanning apparatus and when power is re-supplied, the method comprising:

acquiring image information of an upper part of the image sensor by scanning the upper part of the stopped image sensor;

determining a position of the image sensor with respect to a home position according to the image information of the upper part of the image sensor; and controlling the image sensor to move to the home position by moving the image sensor from a protection wall toward a right side of the protection wall by a certain distance and re-scanning a home sensing label when the image sensor is located near the home position and in a left side of the home position, and controlling the image sensor to move toward the home position when the image sensor is located in a right side of the home position, wherein the home sensing label comprises:

an X portion including a black pixel part; and a Y portion including a black pixel part and a white pixel part, and a lower part of the Y portion is the home position of the image sensor.

2. The method of claim 1, wherein the home position comprises a portion where the image sensor stops and starts to move when the scanning apparatus normally operates.

3. The method of claim 1, wherein the certain distance is about 20 mm.

4. The method of claim 1, wherein the image sensor comprises one of a contact image sensor (CIS) or a charge-coupled device (CCD).

5. A method of a scanning apparatus having an image sensor to scan a document, the method comprising:

scanning one or more patterns disposed above an image sensor when power is re-supplied to the image sensor which has stopped due to a power disruption or a mechanical error;

generating image information corresponding to the scanned one or more patterns; and determining a current position of the image sensor with respect to a home position of the image sensor according to the image information; and controlling the image sensor to move from the position to the home position in one of first and second directions according to the current position of the image sensor and an image change of the image information of the one or more patterns, wherein the scanning apparatus comprises a protection wall disposed at an end portion of a scanning path of the image sensor to prevent the image sensor from colliding with a side wall, and the controlling of the image sensor comprises moving the image sensor from the current position to the home position in the first direction from a protection wall to the home position when the current position of the image sensor is located between the protection wall and the home position, and in the second direction from the current position to the home position when the current position of the image sensor is not located between the protection wall and the home position, according to the image information of the one or more patterns.

6. The method of claim 5, wherein the protecting wall prevents the image sensor from moving in the second direction when the image sensor is located between a first side of the home position or in the home position.

7. The method of claim 5, wherein the controlling of the image sensor comprises re-scanning the one or more patterns to generate second image information and moving the image sensor until the second image information is identical to a pattern image corresponding to the home position.

8. The method of claim 6, wherein the one or more patterns are disposed in a direction parallel to the scanning path and comprises a first portion of a home sensing label disposed on a first side of the home position, a second portion of the home sensing label to correspond to the home position, and a non-home sensing label disposed on a second side of the home position, and the scanning of the one or more patterns comprises scanning one of the first portion of the home sensing label, the second portion of the home sensing label, and the non-home sensing label.

9. The method of claim 8, wherein the scanning of the non-home sensing label comprises scanning one of a document, a cover, and a white sponge disposed on the second side of the home position opposite to the first side of the home position.

10. The method of claim 8, wherein the first portion of the home sensing label comprises one or more black pixel parts, and the scanning of the home sensing label comprises scanning the one or more black pixel parts to detect the image change of the image information due to the scanned one or more black pixel parts.

11. The method of claim 8, wherein second portion of the home sensing label comprises one or more black pixel parts and one or more white pixel parts disposed between the one or more black pixel parts, and the scanning of the home sensing label comprises scanning the one or more black pixel parts and the one or more white pixel parts to detect the image change of the image information due to the scanned one or more black pixel parts and the one or more white pixel parts.

12. The method of claim 11, wherein the controlling of the image sensor comprises stopping the image sensor at the home position according to the image change of the image information representing a length of the one or more white parts of the second portion of the home sensing label.

13. A scanning apparatus to control an image sensor which stops due to a mechanical error or a power interruption and moves along a scanning path in a certain direction to scan in a scanning apparatus when power is re-supplied, the scanning apparatus comprising:

an image sensor to scan an upper part having one or more patterns disposed above the image sensor to acquire image information of the upper part;

a home sensing label to form a portion of the upper part;

a protection wall disposed on an end portion of a scanning path of the image sensor; and a controller to determine a position of the image sensor according to the image information of the upper part of the image sensor, and to control the image sensor to move from the position to the home position in one of first and second directions according to the current position of the image sensor and an image change of the image information of the one or more patterns.

14. The scanning apparatus of claim 13, further comprising a protection wall disposed an end portion of a scanning path of the image sensor to prevent the image sensor from colliding with a side wall of the scanning apparatus, and the controller controls the image sensor to move from the current position to the home position in the first direction from a protection wall to the home position when the current position of the image sensor is located between the protection wall and the home position, and in the second direction from the current position to the home position when the current position of the image sensor is not located between the protection wall and the home position, according to the image information of the one or more patterns.

15. The scanning apparatus of claim 14, wherein the protecting wall prevents the image sensor from moving in the second direction when the image sensor is located between a first side of the home position or in the home position.

16. The scanning apparatus of claim 14, wherein the controller controls the image sensor to re-scan the one or more patterns to generate second image information and to move the image sensor until the second image information is identical to a pattern image corresponding to the home position.

17. The scanning apparatus of claim 14, wherein the one or more patterns are disposed in a direction parallel to the scanning path and comprises a first portion of the home sensing label disposed on a first side of the home position, a second portion of the home sensing label to correspond to the home position, and a non-home sensing label disposed on a second side of the home position, and the controller controls the image sensor to scan one of the first portion of the home sensing label, the second portion of the home sensing label, and the non-home sensing label.

18. The scanning apparatus of claim 17, wherein the first portion of the home sensing label comprises one or more black pixel parts, and the controller controls the image sensor to scan the one or more black pixel parts to detect the image change of the image information due to the scanned one or more black pixel parts.

19. The scanning apparatus of claim 17, wherein second portion of the home sensing label comprises one or more black pixel parts and one or more white pixel parts disposed between the one or more black pixel parts, and the controller controls the image sensor to scan the one or more black pixel parts and the one or more white pixel parts to detect the image change of the image information du to the scanned one or more black pixel parts and the one or more white pixel parts.

* * * * *